United States Patent
Zebian

(10) Patent No.: US 8,312,153 B2
(45) Date of Patent: ***Nov. 13, 2012

(54) INTELLIGENT AUTO-DIALER

(75) Inventor: Marwan Zebian, Agoura Hills, CA (US)

(73) Assignee: NetZero, Inc., Woodland Hills, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 12/710,206

(22) Filed: Feb. 22, 2010

(65) Prior Publication Data

US 2010/0205314 A1    Aug. 12, 2010

Related U.S. Application Data

(63) Continuation of application No. 09/774,968, filed on Jan. 31, 2001, now Pat. No. 7,668,956.

(60) Provisional application No. 60/181,612, filed on Feb. 10, 2000.

(51) Int. Cl.
*G06F 15/16* (2006.01)

(52) U.S. Cl. ........................................ 709/228; 709/219

(58) Field of Classification Search ........................ None
See application file for complete search history.

(56) References Cited

U.S. PATENT DOCUMENTS

| 4,649,533 | A | | 3/1987 | Chorely et al. | |
|---|---|---|---|---|---|
| 5,452,351 | A | | 9/1995 | Yamamoto | |
| 5,570,417 | A | | 10/1996 | Byers | |
| 5,720,035 | A | * | 2/1998 | Allegre et al. | 709/229 |
| 5,862,339 | A | | 1/1999 | Bonnaure et al. | |
| 6,038,602 | A | * | 3/2000 | Ishikawa | 709/227 |
| 6,044,265 | A | * | 3/2000 | Roach, Jr. | 455/419 |
| 6,081,508 | A | * | 6/2000 | West et al. | 370/238 |
| 6,145,002 | A | | 11/2000 | Srinivasan | |
| 6,571,290 | B2 | | 5/2003 | Selgas | |
| 6,578,079 | B1 | * | 6/2003 | Gittins | 709/229 |
| 6,611,862 | B2 | * | 8/2003 | Reisman | 709/227 |
| 8,055,913 | B2 | * | 11/2011 | Ginter et al. | 713/194 |
| 8,112,625 | B2 | * | 2/2012 | Ginter et al. | 713/164 |
| 2002/0013896 | A1 | | 1/2002 | Dieterman et al. | |

FOREIGN PATENT DOCUMENTS

JP    2000-332750    11/2000

* cited by examiner

*Primary Examiner* — Jeffrey R Swearingen
(74) *Attorney, Agent, or Firm* — SoCal IP Law Group LLP; Steven C. Sereboff; M. Kala Sarvaiya

(57) ABSTRACT

The present invention describes an automatic dialer for determining relative rankings of network access numbers from within a group of available network access numbers known as an available NAN list, and for facilitating selection of a network access number to use for a connection from a client device to a data network. Various factors are considered in determining the rankings of the network access numbers. The factors include connection costs, quality of connection.

14 Claims, 4 Drawing Sheets

INTELLIGENT AUTO-DIALER

RELATED APPLICATION INFORMATION

This is a continuation of U.S. application Ser. No. 09/774,968 filed Jan. 31, 2001, entitled "Intelligent Auto-Dialer", now U.S. Pat. No. 7,668,956, which claims priority from provisional U.S. Application No. 60/181,612 filed Feb. 10, 2000, entitled "Intelligent Auto-Dialer for Network System", both of which are incorporated herein by reference.

This application is also related to the following applications which are incorporated herein by reference:
  Application No. 60/160,395, filed Oct. 19, 1999 entitled "Internet Service Error Tracking," and
  application Ser. No. 09/628,971 filed Jul. 31, 2000 entitled "Internet Service Error Tracking" now U.S. Pat. No. 6,776,369.

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to computer-to-computer session/connection, such as for a client computer to connect to the Internet. The invention further relates to controlling access by a client computer to resources on the network.

2. Description of Related Art

There are a number of types of online service providers (OSPs), some of which serve the general public and others of which serve a limited class of individuals. OSPs typically provide Internet access, and are therefore sometimes referred to as ISPs. An OSP, as used herein, is an organization which contracts for the provision of access to a data network to end-users. Some OSPs charge a fee for subscriptions to their online services. These fees typically are in the form of a sign-up fee, and fixed and/or incremental online charges. Some OSPs provide services for free or at a discount, and offset their costs through advertising or otherwise. As used herein, an OSP is an entity having a direct relationship with a user, characterized in that the OSP maintains an account for the user.

Some OSPs own, manage and/or control points of presence (POPs) in phone company central offices (COs) for their online services. As such, these OSPs are considered to have proprietary back end networks. These OSPs purchase or lease their POPs, and have contracts with the phone companies for providing phone numbers and service for connecting their POPs to the public switches. These OSPs also contract to connect their POPs to the data network, if necessary.

Some OSPs utilize the POPs of other companies. These other companies will be referred to herein as back end providers (BEPs). In contrast to an OSP, a BEP has no contractual relationship with the end users, nor do the BEPs maintain accounts for the end users. Rather, the BEPs provide a switching fabric from COs to the data network, and simply satisfy or deny a user's request for a back end connection to the data network at the discretion of the respective OSP. BEPs can obtain economies of scale and volume by providing back end services to many OSPs. The BEPs purchase or lease their POPs, and have contracts with the phone companies for providing network access numbers and service for connecting their POPs to the public switches. The BEPs also contract to connect their POPs to the data network, if necessary. There is yet another contract between the OSP and the BEP, under which the OSP pays for the usage of the BEP's switching fabric.

The typical topology for network access may be extended to national and international proportions. In practice there are hundreds of COs owned by a variety of telecom companies, each with an array of POPs and numerous network access numbers. Users prefer a front end which is low in cost. OSPs which provide national or international online services therefore strive to make available network access numbers for their users which will allow the users to obtain low cost front ends. Although toll-free numbers are sometimes provided, this type of phone company service is uneconomical for extended usage of online services.

In typical systems, the client device will have a list of network access numbers (a "NAN list"). For a dial-up connection in the United States and Canada, the NAN is a phone number in the form (NPA) NXX-xxxx, where NPA is the area code, NXX is the local exchange, and xxxx identifies the last four digits of the phone number. The client device sequentially attempts to utilize each NAN in the NAN list to obtain a connection to the data network until successful. The users typically control the NAN list, and select NANs from a master list from the OSP. The OSP generally has no role in the selection of NANs aside from provision of the master list.

The number, distribution and service needs of users, plus the number and distribution and service capabilities of COs, BEPs, their POPs and connections results in considerable variations in cost and quality for front ends and back ends. The quality of a front end using a particular network access number often varies depending on many factors, such as the brand and model of dial-up modem being used, the phone company lines being used, temporary hardware or software problems experienced by the BEP, etc. The quality of a back end from a particular POP often varies depending on many factors, such as the brand and model of the BEP's equipment, the central office equipment, temporary hardware or software problems experienced by the BEP and the CO, capacity, loads, etc.

Users may experience problems in connecting to the data network, such as busy signals, failure to connect and dropped connections. An individual user has no reasonable means available to determine which of the available NANs is the most effective in terms of quality of connection. Instead, users typically have to learn through experience. Yet, changing conditions limits the value of any individual user's experience. Thus, users typically initially include in their NAN lists all NANs from their OSP which are local, and eliminate those which are especially bad.

Likewise, OSPs typically apply little or no control of what network access numbers their users select and use. At best, OSPs generally control their users' choice of NANs in an unsophisticated and manual fashion—they enter into a contract with a BEP and make the BEP's NANs available to their users.

SUMMARY OF THE INVENTION

In accordance with the present invention, a sequence for a client device to select NANs from a user NAN list is based upon information obtained by an OSP and provided to the client device. NANs are selected from the user NAN list based upon quality of a back end connection and/or cost of the back end connection. The invention may be embodied in methods, apparatus and computer program code.

For example, according to a first aspect of the invention, there is a method for maximizing qualities of a user network access number (NAN) list. The user NAN list comprises plural NANs, and the NANs for use by a user's client device in connecting to a data network under control of a server system. One step of the method comprises storing in the server system an available NAN list of NANs available for the client device to connect to the data network, wherein the user NAN list comprises a subset of the available NAN list. Another step of the method comprises storing in the server system connection information about connecting from the NANs in the available NAN list to the data network. Another step of the method comprises connecting the client device to the server system. Another step of the method comprises setting the NANs in the user NAN list based upon the available NAN list. Another step of the method comprises setting an order for selecting the NANs in the user NAN list based upon the connection information, wherein the order is set outside of the user's control. Another step of the method comprises disconnecting the client device from the server system.

According to a second aspect of the invention, there is a method for setting an order for using NANs in a user NAN list. The user NAN list comprises plural NANs. The NANs are for use by the user's client device in connecting to a data network under control of an online service provider server system. A connection from the client device to the data network comprises a front end portion and a back end portion. The front end portion comprises a first connection from the client device to a public switch. The back end portion comprises a second connection from the public switch to a point of presence under control of one of plural back end providers plus a third connection from the point of presence to the data network. Authorization for the back end provider to establish the back end portion is by the online service provider server system. Each NAN is associated with one of the back end providers, the method comprising One step of the second method comprises storing in the online service provider server system an available NAN list of NANs available for the user's client device to connect to the data network. The user NAN list comprises a subset of the available NAN list. Another step of the method comprises storing in the online service provider server system connection information for connecting from the NANs in the available NAN list to the data network. The connection information comprises at least one of (a) quality of connection information for the back end portion and (b) costs information for the back end portion. Another step of the method comprises establishing a connection from the client device to the online service provider server system. Another step of the method comprises transmitting an identification of the NANs in the user NAN list from the client device to the online service provider server system. Another step of the method comprises setting an order for selecting the NANs in the user NAN list based upon at least one of (a) the stored quality of connection information for the back end portion and (b) costs information for the back end portion.

According to a third aspect of the invention, there is a method for connecting from a client device to a data network under control of an online service provider server. A connection from the client device to the data network comprises a front end portion and a back end portion. The front end portion comprises a first connection from the client device to a public switch. The back end portion comprises a second connection from the public switch to a point of presence under control of one of plural back end providers plus a third connection from the point of presence to the data network, wherein authorization of the back end portion is by the online service provider server system. Each NAN is associated with one of the back end providers.

One step of the third method comprises storing a user network access number (NAN) list in the client device. Another step of the third method comprises sequentially dialing NANs from the user NAN list based upon an order of selection until the front end portion is established and the back end portion is authorized. The order is based upon the cost of the back end portion and historical quality of connection statistics for the back end.

Still further objects and advantages attaching to the system and methods will be apparent to those skilled in the art from the following particular description.

DESCRIPTION OF THE DRAWINGS

The present invention will be described by way of exemplary embodiments, but not limitations, illustrated in the accompanying drawings in which like references denote similar elements.

These and additional embodiments of the invention may now be better understood by turning to the following detailed description of an embodiment.

DETAILED DESCRIPTION OF THE INVENTION

Throughout this description, the embodiments and examples shown should be considered as exemplars, rather than limitations on the apparatus and methods of the present invention.

The System of the Invention

The system of the invention enables the creation and maintenance of an ordered NAN list from available NANs, wherein the list is ordered according to various factors. The system of the invention enables the automatic selection and use of the highest ranked NAN for actual connection to a data network.

Figure 1:
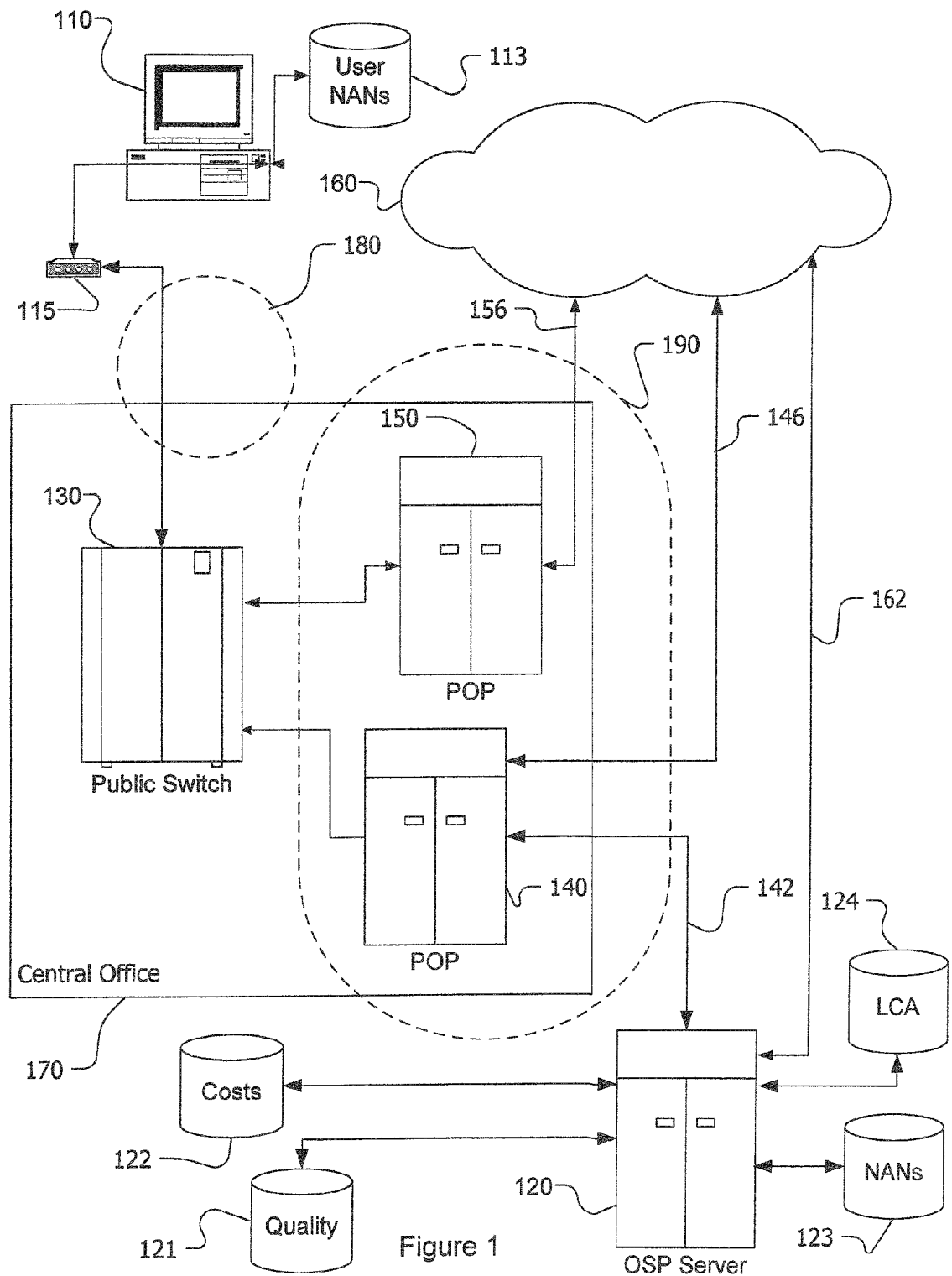
FIG. 1 is a block diagram of a system topology for providing users with online access services which may be used in conjunction with the present invention.

Referring now to FIG. 1, there is shown a system topology for providing users with online access services. FIG. 1 shows a client device 110, an OSP server 120, a public switch 130, a first POP 140, a second POP 150 and a data network 160 (e.g., the Internet). the connection of the client device 110 to the data network 160 comprises two parts—a front end 180 and a back end 190.

The client device 110 comprises a computer configured to connect to the data network 160 for accessing servers such as a web server. The client device 110 may be, for example, a PC running a Microsoft Windows operating system, an Internet appliance, network computer (NC), or an appropriately Internet-enabled device such as a portable digital assistant (PDA), mobile phone, refrigerator, etc. The particular type of device of the client device 110 is not considered to be important. The client device 110 connects to the public switch 130 through an integrated, internal or external communications adapter 115, such as an analog modem, an Ethernet adapter, DSL adapter or cable modem. The client device 110 may include a memory 113 for storing NAN lists. For most embodiments, the memory 113 should be nonvolatile, such as a hard drive or flash memory.

A NAN list used by the client device 110 will be referred to herein as a "user NAN list." The client device 110 may utilise a number of different user NAN lists. Different user NAN lists may be useful, for example, when a portable computer is used at different locations. Each user NAN list may be separately identifiable. This separate identifier may include or be supported by a version code for each user NAN list, for reflecting the content in the user NAN lists. This version code may comprise an encoded version of the user NAN list.

The OSP server 120 may maintain a number of databases 121, 122, 123, 124 and may provide authentication and billing controls. The databases 121, 122, 123, 124 may include a network quality database 121, a network costs database 122, an available NANs database 123, and a local calling area database 124. The OSP server 120 may also store information reflecting the user NAN list of each client device, using the identifier and/or the version code mentioned above. The databases 121, 122, 123, 124 may viewed as comprising or providing an available NANs list, having variously cost, quality and locality information.

The available NANs database 123 identifies NANs which are available for use by the OSP's subscribers. The available NANs database 123 comprises a superset of the user NAN list 113. The available NANs database 123 may include a record for each available NAN. A NAN's record may identify the protocol type or capacity for the NAN (e.g., V90, ISDN), and the corresponding CO, POP, BEP, city and state. According to one aspect of the invention, a NAN's record includes ranking information for the NAN. This ranking information may be in the form of a primary rank, an alternate rank and a primary percentage. The record may further include a reprompt interval. The use of the primary rank, the alternate rank, the primary percentage and the reprompt interval is described below.

One or more client devices subscribed to the services of the OSP may provide connection quality information to the OSP server 120, and the OSP server may aggregate connection quality information into the network quality database 121 as historical quality-of-connection statistics associated with the NANs. The network quality database 121 may relate this information in varying granularity, such as by NAN, POP or BEP. The network quality database 121 may further support aging of the connection quality information, so that newer information may be accorded greater credibility. The network quality database 121 or the available NANs database 123 may further include information about performance capabilities (e.g., bandwidth) and availability of NANs and POPs. Network quality information may also be obtained from phone companies or other service providers, including BEPs.

The network costs database 122 stores information about the cost of using the services of the BEPs. The cost information may include such matters as flat fees for fixed amounts of service from a particular BEP or POP, and additional fees for exceeding fixed amounts of service. The fees charged by BEPs can be flexible and varied, and the database 122 may be designed to store and provide the fee information. The network costs database 122 may relate this information in varying granularity, such as by NAN, POP or BEP. Thus, the cost information for each NAN may includes a cost of providing a connection from the respective central office to the data network.

The local calling area database 124 stores information about the local calling area for NANs in the available NANs database 123. In the US, telephone connections within a local calling area are typically free. Costs outside of the local calling area may vary. Thus, for the front end 180 to be free to the user, the user must establish a connection to a POP by dialing a NAN which is in his local calling area. To serve these goals, the local calling area database 124 stores records correlating available NANs to client device 110 location. In this regard, the local calling area database 124 may store records of POPs or available NANs, and information to tie those POPs or available NANs to location information of the client devices. This location may be defined (e.g., as a city and state, map sector, zip code, etc.) or derived from the area code and local exchange (i.e., (NPA) NXX) of the phone number from which the client device 110 dials into the public switch 130. Where the front end 180 comes at some cost to the user, there may be defined a local calling area for which the cost of a telephone connection is below a predefined threshold. This threshold may be defined by the OSP or by the user and incorporated into the local calling area database 124.

The public switch 130, the first POP 140, and the second POP 150 are housed in a building known as a central office, or CO 170. The POPs 130, 140 are devices which provide communication channels from the public switch 130 to the Internet 160. Because of their co-location with the public switch 140 at the CO 170, the POPs 140, 150 are known as "points of presence" for the respective BEPs. For each POP 140, 150, there are respective available NANs. An "available NAN" is a NAN which the OSP can make available to the client device 110 for establishing a connection to the data network 160.

The front end 180 is from the client device 110 to the public switch 130 (e.g., by having his modem dial into the public switch 130). The front end 180 may be analog or digital, dial-up, constantly-connected or wireless. In the case of an analog front end, the phone company assigns phone numbers to each POP 140, 150, and the client device 110 dials into one of these phone numbers and connects with the corresponding POP 140, 150. Typically, the user is responsible for the cost of the front end 180. For example, users who connect to the public switch 130 using a dial-up modem often incur connection fees in the form of local, local toll or long distance fees charged by the phone companies. The term "network access number" will be used to refer to the address within the public switch 130 which the client device 110 connects to, and is exemplified by the phone number which an analog modem dials into.

The back end 190 is from the public switch 130 to the data network 160. The back end 190 is generally hidden from the user, and the typical user is entirely unaware of how his client device 110 connects to the data network 160, except for the front end 180. The back end 190 costs include the equipment cost of the POPs 140, 150, the fees due to the phone company for providing NANs and service for connecting the POPs 140, 150 to the public switch 130, and the cost of connecting the POPs 140, 150 to the data network 160.

To support the back end 190, there are communication channels from the POPs 140, 150 to the OSP server 120. There may be a direct communications channel 142, such as from POP 140 to OSP server 120. There may be an indirect communication channel, such as from POP 150 to the OSP server 120. This indirect channel comprises connection 156 from POP 150 to the data network 160 and connection 162 from the data network 160 to the OSP server 120. The back end 190 may also route through the OSP server 120. When a client device 110 seeks a connection from the public switch 130 to the data network 160, the respective POP 140, 150 cooperates with the OSP server 120 to perform authentication (i.e., based upon identification information of the user, permit or deny a back end). If the user is not authentic, then the respective POP 140, 150 causes the front end 180 to be torn down (e.g., hangs up on the user).

Computer software programmed to implement the methods described herein may be stored and operated at the client device 110, a server such as OSP server 120, a third party computer such as POPs 140, 150, or combinations thereof.

The Methods of the Invention

According to the methods of the invention, the client device 110 and OSP server 120 cooperate for the ordering of the client device's NAN list. Based upon the aggregate quality information as well as cost information in the database 122, the client device's NAN list can be ordered. The ordering may be performed by the client device 110 or the OSP server 120. Although processes are described below as separate, it should be appreciate that these processes may be combined.

Figure 2:
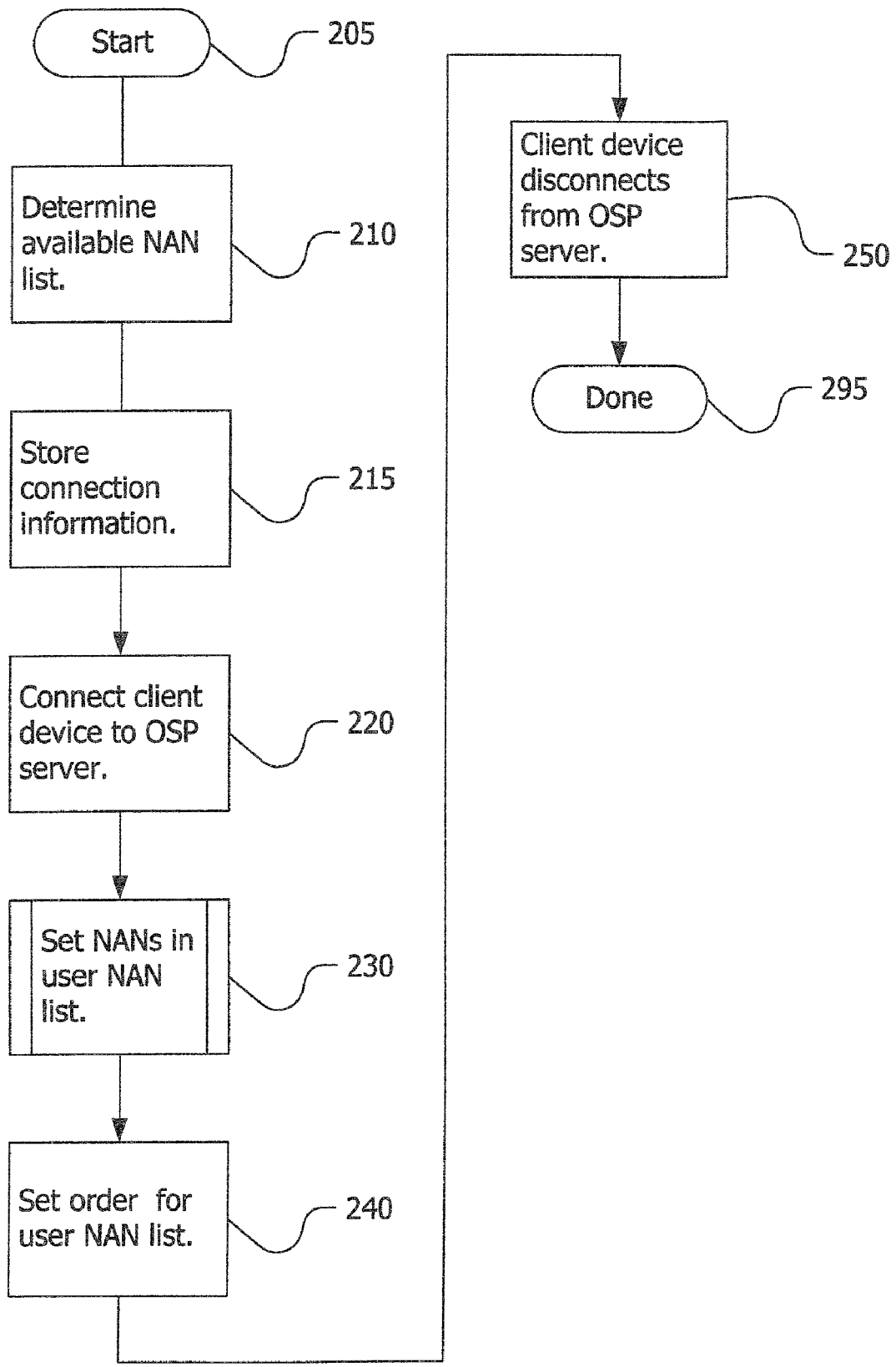
FIG. 2 is a flowchart of a method for maximizing qualities of a user NAN list in accordance with the invention.

Referring now to FIG. 2, there is shown a flowchart of a method for maximizing qualities of a user NAN list in accordance with the invention. After the method begins (step 205), a number of preparatory steps are performed.

In the first preparatory step, the available NANs for the OSP is determined and stored by the OSP server 120 in the available NAN database 123 (step 210). The OSP server 120 also stores connection information about connecting from the available NANs to the data network in the network quality database 121, the cost information database 122 and the local calling area database 124 (step 215). The connection information stored in the databases 121, 122, 123, 124 is described above.

These preparatory steps 210, 215 may be performed on an ongoing basis, such that the available NANs and the connection information is updated, corrected and enhanced. In particular, the quality information may change on a minute-by-minute basis, as client devices connect and provide information about their own connections to the OSP server 120.

With the databases 121, 122, 123, 124 in order, the user NAN list may be maximized. It is presumed that the client device 110 has at least one NAN or other method for connecting to the OSP server 120. For example, as part of the process of subscribing to an Internet service, the user may be permitted to select NANs from the available NANs. The available NANs may be included in a software installation package, or the user or client device 110 may look up the available NANs from a published list. The initial user NAN list may include only one entry, such as a toll-free number.

Thus, the method continues with the client device 110 connecting to the OSP server 120 (step 220). The client device 110 may at this point or later provide the OSP server 120 with information of the quality of the client device's connections for incorporation into the network quality database 121.

The NANs in the user NAN list are then set based upon the available NANs (step 230). An embodiment of this step 230 is described below with respect to FIG. 3. One effect of this step 230 is that the OSP server 120 knows the user NAN list 113 stored by the client device 110.

With the user NAN list set, the order for the NANs in the user NAN list 113 may be set based upon the connection information (step 240). This step 240 may be performed at every connection, on a demand basis by the client device 110, on a schedule of the OSP server 120, or at manually-determined times.

The order for the NANs in the user NAN list 113 may be set in at least four different ways, with the intelligence primarily residing in either the client device 110 or the OSP server 120. These include direct or indirect sequential ordering, using rankings, providing quality information and a selection algorithm, or manually. In effect, these different ways result in either the client device 110 or the OSP server 120 to set the actual sequence of the NANs in the user NAN list 113.

In sequential ordering, the order of the NANs in the NAN list determines the sequence of their selection. Thus, the rank for a given NAN in the user is defined by its placement in the user NAN list 113. The OSP server 120 may have a copy and revise the user NAN list so that the NANs are in a desired sequence, and then transmit the revised user NAN list to the client device 110 for storage. Instead of re-ordering the NANs in the user NAN list, the OSP server 120 may provide instructions to the client device 110 for indirectly dictating the sequencing. The sequencing instructions may be in the form of an ordered list of pointers to the NANs in the user NAN list 113.

Another way of setting the order for the NANs in the user NAN list 113, similar to indirect sequencing, is the use of NAN rankings. That is, the OSP server 120 provides ranking information for one or more NANs in the user NAN list 113. The client device 110 may later use these rankings to decide a sequence of use of the NANs in the user NAN list 113. As mentioned above, the available NAN database 123 may store a primary rank for each available NAN. The OSP server 120 provides the primary rank for each NAN in the user NAN list to the client device 110. Use of only the primary rank may give rise to congestion problems, because all users who are local to a highly ranked NAN will have a user NAN list which favors that highly ranked NAN. Conversely, a lowly ranked NAN may never be used, and this too could be undesirable. To overcome this problem, the alternate rank and the primary percentage may be provided. The alternate rank is different from the primary rank. The primary percentage dictates how often the OSP server 120 should assign the primary rank to the users' NAN lists, and how often to assign the alternate rank to the users' NAN lists. For example, a primary percentage of 75% would indicate that the primary rank should be provided to the client devices 75% of the time that ranking information is provided, and the alternate rank should be provided to the client devices 25% of the time that ranking information is provided.

In another way of setting the order for the NANs in the user NAN list 113, the client device 110 handles most of the decision workload. According to this way, the OSP server 120 provides the client device 110 with connection information and a selection algorithm, and the client device determines the selection orders of the NANs.

In another way of setting the order for the NANs in the user NAN list 113, the user is permitted to manually adjust or set the selection order. In general, where the OSP is responsible for the back end costs, allowing the user to change the selection order is undesirable. On the other hand, if the user is responsible for certain costs, it may be desirable to allow the user some control over the selection order.

The ranking or sequence of NANs is made based upon at least the quality information and/or cost information in the databases 121, 122. Varying weight may be given to different connection qualities and cost factors. These weights may vary with time, and may be relative. As mentioned above, one way to favor one NAN over another is through express rankings, such as the primary ranking and alternate ranking.

Finally, the client device 110 disconnects from the server system 120 (step 250), so that a new session may be started later using the user NAN list, as set and ordered in steps 230 and 240. As such, the method is complete (step 295).

Figure 3:
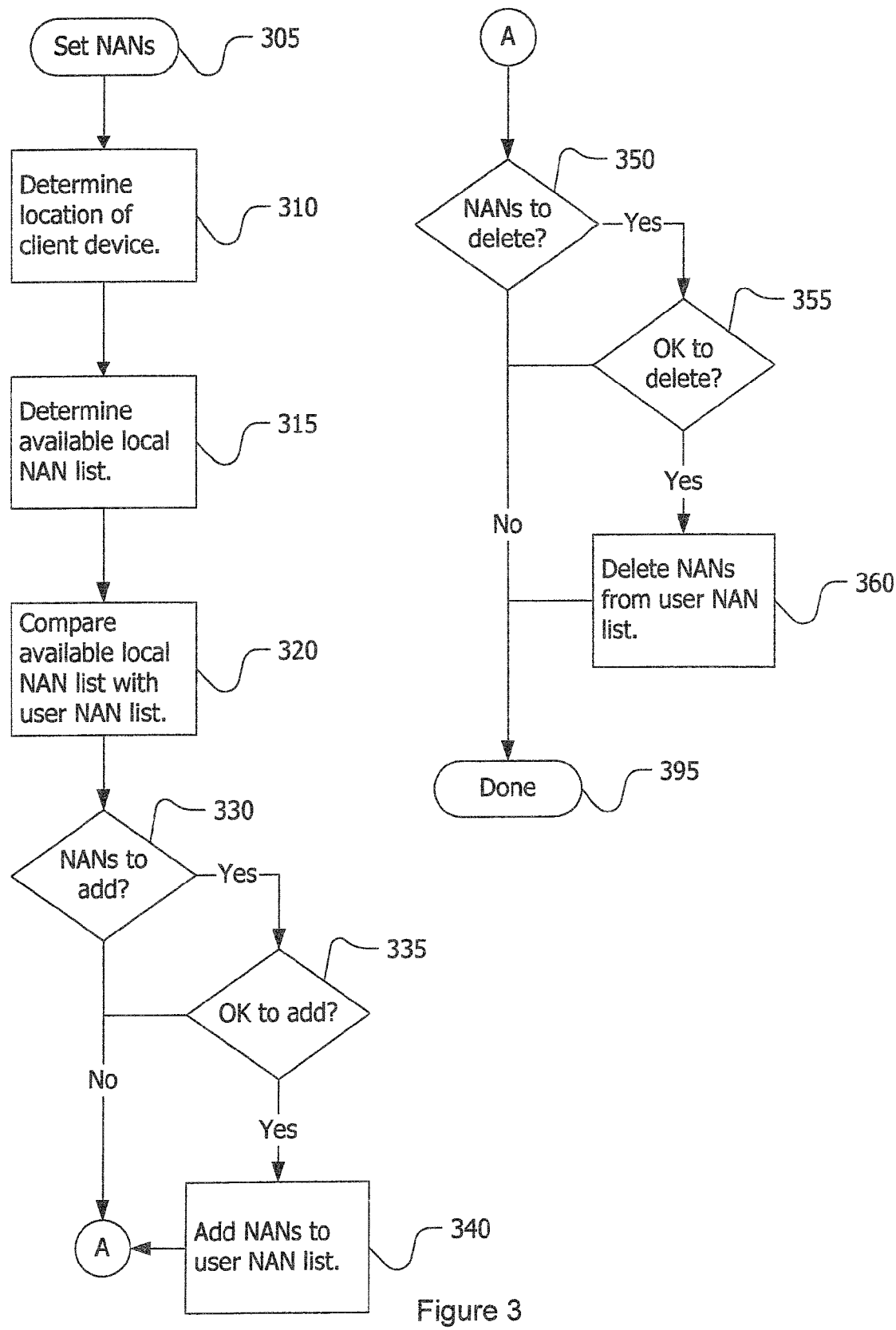
FIG. 3 is a flowchart of a method for setting a user NAN list in accordance with the invention.

Referring now to FIG. 3, there is shown a flowchart of a method for setting a user NAN list in accordance with the invention. After the method begins (step 305), location information for client device 110 is determined (step 310). The location of the client device 110 may be determined in many ways, and the location information may be provided by the user, or determined directly or indirectly. For example, the client device 110 may ask the user to enter phone number information, such as the full phone number or just his area code and local exchange; the client device 110 may ask the user to enter his geographic location, such as a city and state, zip code, or mapping region; or the public switch 130 may report the phone number through a service such as caller-ID or automatic number identification (ANI). In general, location information which is produced automatically, such as caller-ID or ANI, is more reliable than location information which is produced manually. This location information is then used by the client device 110 or OSP server 120 to set the NANs in the user NAN list 113 by correlating the location of the client device 110 to the location information associated with the available NANs.

Next, an available local NAN list is determined based upon the location of the client device 113 and the location information for the available NANs in the local calling area database 124 (step 315). It may be desirable to limit the size of the available local NAN list.

Next, the available local NAN list is compared with the user NAN list (step 320). One way to perform this comparison is to compare the version code of the user NAN list 113 from the client device 113 to a version code for the available local NAN list from the OSP server 120. If the versions codes are different, then it can be deduced that the user NAN list is different from the available local NAN list. The differences may also be deducible from such a comparison. Alternatively, the NANs in the available local NAN list may be compared with the NANs in the user NAN list. This comparison may be performed by the client device 110 or the OSP server 120, and may require transmitting the user NAN list from the client device 110 to the OSP server 120, or the available local NAN list from the OSP server 120 to the client device 110.

One result of this comparison is identification of NANs in the available local NAN list which are not in the user NAN list ("good NANs"). If there are good NANs (step 330), then the user may be asked for permission to add the good NANs to the user NAN list 113 (step 335). If the user so approves, then the good NANs are added to the user NAN list 113 (step 340). The user might want to refuse a good NAN if he believes that the good NAN will be costly to him. Another result of this comparison may be identification of NANs in the user NAN list which are not in the available local NAN list ("bad NANs"). If there are bad NANs (step 330), then the user may be asked for permission to delete the bad NANs from the user NAN list 113 (step 335). If the user so approves, then the bad NANs are deleted from the user NAN list 113 (step 340). It may also be desirable to limit the size of the available local NAN list.

After the good and bad NANs have been resolved, the OSP server 120 may update its record of which NANs are in the user NAN list 113. With good and bad NANs addressed, the method is complete (step 395).

Figure 4:
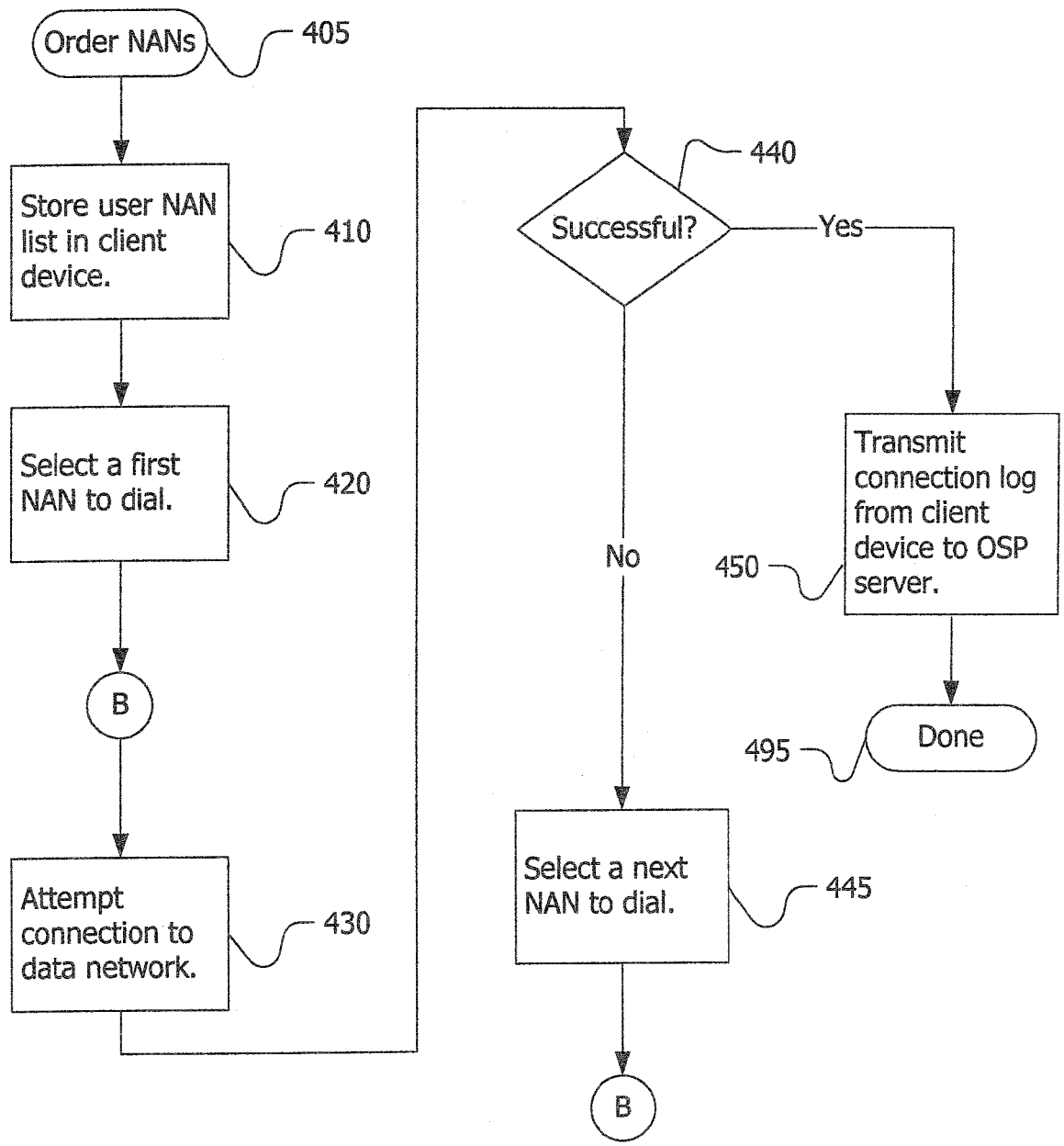
FIG. 4 is a flowchart of a method of connecting a client device to a data network in accordance with the invention.

Referring now to FIG. 4, there is shown a flowchart of a method of connecting the client device 110 to the data network 160 in accordance with the invention. The method in large part comprises sequentially dialing NANs based upon an order specified in the user NAN list until a communication link is established between the client device 110 and the data network 160.

After entry into the method (step 405), the user NAN list is stored in the client device 110 as an initial matter (step 410). Next, a first NAN from the user NAN list is selected (step 420). As discussed above, there are a number of ways to specify the sequence of selection of NANs from the user NAN list 113. The critical aspect of NAN selection is that, rather than some arbitrary selection order, the selections are made based upon at least the cost of the back end connection 190, and/or quality of connection information for connections for the back end 190. This information may be derived from the network cost database 123 and the network quality database 121. The cost of the front end 180 may also be taken into consideration.

The ranking criteria used in determining the rankings or order of selection of the NANs in the user NAN list 110 may be proprietary and may vary widely. There may be a single criterion, or various criteria may be used in combination. In either case, various algorithms may be implemented to determine the ultimate ranking or order of selection of NANs. In addition, the rankings may include scores or weighted values, such that not only could a relative order of the network access numbers be determined, but relative values as well. This might be desirable for use in determining a specific sequential dialing algorithm.

As an example of ranking NANs, assume there are three NANs in the user NAN list 113: A, B, and C. If A has a poor history of service regarding ability to establish and maintain connections, B has an excellent history, and C has an average history, then the NANs could be given rankings to reflect this. The effect of these rankings is that the NAN with the best history in terms of quality of connection will be tried first.

As another example of ranking NANs, assume there are three NANs in the user NAN list 113: D, E and F. Further assume that each of the three NANs are supported by different BEPs (BEP-D, BEP-E, and BEP-F respectively). Further assume that the OSP has contracted to pay a flat fee to BEP-D for a fixed amount of connection time each month, the OSP has contracted to pay BEP-E a low per-minute rate, and the OSP has contracted to pay BEP-F a high per-minute rate. Finally, assume that the monthly minimum for BEP-D has not yet been met. Under these circumstances, D can be ranked highly to favor use of D. On the other hand, if the quality of D is poor, its ranking might be lowered.

The client device 110 then attempts to establish the connection to the data network 160 (step 430). If the attempt is successful (step 440), then the client device 110 may transmit a connection log from to the OSP server 160. The client device 110 may be permitted or required to retry NANs a specific number of times; three retries per NAN is typical. The ranking information may itself favor retries of some NANs over others. The connection log include information about various events that have occurred at the client device 110 during previous connections or connection attempts. This data may include, the various network access numbers which the client device 110 has attempted to use, the times of the attempts, the results of the attempts (e.g., connected, failure to connect, dropped, busy, etc.), reasons for disconnect (voluntary or involuntary), the length of the connections, and other error information or connection information that is maintained. As explained above, the OSP server 120 may aggregate the information from the connection logs of many client devices to produce historical quality of connection statistics, information in the network quality database 121, and NAN rankings. With the connection established, the method is complete (step 495).

However, if the attempted connection is not successful (step 440), then the method continues with the selection of a next NAN to dial in the manner described with respect to selection of the first NAN (step 445). The method can then continue with attempting to establish a connection using the next NAN (step 430). If, after attempting a connection using the last NAN or lowest-ranked NAN in the user NAN list a session has still not been established, then the process may start over again beginning with the first NAN in the user NAN list or terminate. In this regard, failed connections by a client device 110 may be used by the client device 110 to revise the rankings of the NANs.

Steps 420 through 450 are performed during a single online session, and may be repeated during subsequent sessions. In such a situation, the user NAN list at the beginning of a given session will be in the form set during the preceding session.

The inventions described herein may provide a number of benefits to users, OSPs and others. Users may experience higher connection success rates and better connection quality. Users may also avoid front end charges. OSPs may benefit from greater management of their costs while at the same time seeing improved good will from their users. In environments where connection costs and quality can change considerably in a short period of time, the inventions may provide OSPs with control previously unavailable. Even BEPs may benefit, because BEPs which are diligent in reducing costs to the OSP and improving quality may experience rapid or even immediate rewards through higher usage of their POPs.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method for maximizing qualities of a user network access number (NAN) list, the user NAN list comprising plural NANs, the NANs for use by a user's client device in connecting to a data network under control of a server system, the method comprising storing in the server system an available NAN list of NANs available for the client device to connect to the data network, wherein the user NAN list comprises a subset of the available NAN list storing in the server system a quality of connection information for connecting from the NANs in the available NAN list to the data network, wherein the quality of connection information includes a capacity information and a load information for connecting from the NANs in the available NAN list to the data network connecting the client device to the server system updating the server system with a new quality of connection information of the client device, wherein the new quality of connection information is based on the client device using the NANs in the available NAN list to connect to the data network, storing in the server system the new quality of connection information of the client device setting an order for selecting the NANs in the user NAN list based upon the new quality of connection information, wherein the setting includes transmitting an identification of the NANs in the user NAN list from the client device to the server system, and further wherein the setting comprises using a primary rank, an alternate rank and a primary percentage associated with each NAN for selecting an order in the user NAN list, and disconnecting the client device from the server system.

2. The method of claim 1 wherein the setting an order comprises providing a sequence list which identifies the order for using the NANs in the user NAN list.

3. The method of claim 1 wherein the NANs are for providing the client device with a connection to the data network through plural back end networks each NAN is associated with a one of plural back end providers each back end network is associated with one of the back end providers a cost information is associated with one of the back end providers, and the cost information includes a cost from the back end provider for the client device to utilize the back end network of the back end provider the back end providers permit a connection through their back end networks to the client device under the authorization of the server system.

4. The method of claim 3 wherein there is a version code associated with the user NAN list for identifying a current version of the user NAN list, and the transmitting an identification comprises transmitting the version code from the client device to the server system.

5. The method of claim 4 wherein the transmitting an identification comprises transmitting the user NAN list from the client device to the server system.

6. The method of claim 4 wherein the setting an order is performed by the client device.

7. The method of claim 4 wherein the setting an order is performed by the server system.

8. A system for maximizing qualities of a user network access (NAN) list, the user NAN list comprising plural NANs, the NANs for use by a user's client device in connecting to a data network under control of a server device, the system comprising the server device comprising a processor a memory wherein the processor and the memory comprise circuits and software for storing in the server device an available NAN list of NANs available for the client device to connect to the data network, wherein the user NAN list comprises a subset of the available NAN list storing in the server device a quality of connection information for connecting from the NANs in the available NAN list to the data network, wherein the quality of connection information includes a capacity information and a load information for connecting from the NANs in the available NAN list to the data network updating the server device with a new quality of connection information of the client device, wherein the new quality of connection information is based on the client device using the NANs in the available NAN list to connect to the data network, storing in the server device the new quality of connection information of the client device setting an order for selecting the NANs in the user NAN list based upon the new quality of connection information, wherein the setting includes transmitting an identification of the NANs in the user NAN list from the client device to the server device and further wherein the setting comprises using primary rank, an alternate rank and a primary percentage associated with each NAN for selecting an order in the user NAN list.

9. The system of claim 8 wherein the setting an order comprises providing a sequence list which identifies the order for using the NANs in the user NAN list.

10. The system of claim 8 wherein
the NANs are for providing the client device with a connection to the data network through plural back end networks
each NAN is associated with a one of plural back end providers
each back end network is associated with one of the back end providers
a cost information is associated with one of the back end providers, and the cost information includes a cost from the back end provider for the client device to utilize the back end network of the back end provider
the back end providers permit a connection through their back end networks to the client device under the authorization of the server device.

11. The system of claim 8 wherein there is a version code associated with the user NAN list for identifying a current version of the user NAN list, and the transmitting an identification comprises transmitting the version code from the client device to the server device.

12. The system of claim 8 wherein the transmitting an identification comprises transmitting the user NAN list from the client device to the server device.

13. The system of claim 8 wherein the setting an order is performed by the client device.

14. The system of claim 8 wherein the setting an order is performed by the server device.

* * * * *